(12) United States Patent
Liang et al.

(10) Patent No.: US 10,505,613 B2
(45) Date of Patent: Dec. 10, 2019

(54) COMMUNICATION SYSTEM

(71) Applicant: NEC Corporation, Tokyo (JP)

(72) Inventors: Caroline Liang, London (GB); Robert Arnott, London (GB)

(73) Assignee: NEC CORPORATION, Minato-ku, Tokyo (JP)

( * ) Notice: Subject to any disclaimer, the term of this patent is extended or adjusted under 35 U.S.C. 154(b) by 95 days.

(21) Appl. No.: 15/735,348

(22) PCT Filed: Jun. 7, 2016

(86) PCT No.: PCT/JP2016/002748
§ 371 (c)(1),
(2) Date: Dec. 11, 2017

(87) PCT Pub. No.: WO2016/199403
PCT Pub. Date: Dec. 15, 2016

(65) Prior Publication Data
US 2018/0175923 A1    Jun. 21, 2018

(30) Foreign Application Priority Data

Jun. 12, 2015  (GB) .................................. 1510325.2

(51) Int. Cl.
| | |
|---|---|
| *H04B 7/06* | (2006.01) |
| *H04B 7/024* | (2017.01) |
| *H04L 1/00* | (2006.01) |
| *H04W 24/10* | (2009.01) |
| *H04L 5/00* | (2006.01) |

(52) U.S. Cl.
CPC ........... *H04B 7/0626* (2013.01); *H04B 7/024* (2013.01); *H04L 1/0026* (2013.01); *H04W 24/10* (2013.01); *H04L 5/0035* (2013.01)

(58) Field of Classification Search
None
See application file for complete search history.

(56) References Cited

U.S. PATENT DOCUMENTS

| | | | |
|---|---|---|---|
| 9,532,362 B2 | 12/2016 | Marinier et al. | |
| 9,674,849 B2 * | 6/2017 | Choi .................... | H04B 7/0413 |
| (Continued) | | | |

FOREIGN PATENT DOCUMENTS

| | | |
|---|---|---|
| JP | 2015061248 A | 3/2015 |
| JP | 2016504823 A | 2/2016 |

(Continued)

OTHER PUBLICATIONS

Communication dated Jul. 9, 2019, from the Japanese Patent Office in counterpart Application No. 2017-564522.

(Continued)

*Primary Examiner* — Brian S Roberts
(74) *Attorney, Agent, or Firm* — Sughrue Mion, PLLC

(57) ABSTRACT

A communication system is disclosed in which coordinated multi-point transmissions for a mobile device are carried out in two stages. In the first stage, a central controller obtains Channel State Information (CSI) reports from multiple transmission points, based on which the controller estimates respective data rates for transmissions between each transmission point and the mobile device. The controller determines an active set of transmission points to be associated with the mobile device, and informs the transmission points about the association made. In the second stage, the transmission points included in the active set carry out scheduling for the mobile device independently from each other until the controller updates the active set of transmission points.

11 Claims, 7 Drawing Sheets

(56) References Cited

U.S. PATENT DOCUMENTS

| | | |
|---|---|---|
| 2010/0103834 A1 | 4/2010 | Gorokhov et al. |
| 2010/0104033 A1* | 4/2010 | Gorokhov ............. H04L 1/0026 375/260 |
| 2010/0304682 A1 | 12/2010 | Choi et al. |
| 2011/0237272 A1 | 9/2011 | Gorokhov et al. |
| 2011/0281585 A1 | 11/2011 | Kwon et al. |
| 2012/0026940 A1* | 2/2012 | Barbieri ................ H04L 5/0032 370/328 |
| 2012/0196607 A1 | 8/2012 | Samardzija et al. |
| 2013/0021925 A1* | 1/2013 | Yin ........................ H04B 7/024 370/252 |
| 2013/0088960 A1* | 4/2013 | Bi ......................... H04L 1/1841 370/235 |
| 2014/0269596 A1 | 9/2014 | Kim et al. |

FOREIGN PATENT DOCUMENTS

| | | |
|---|---|---|
| WO | 2011/022733 A2 | 2/2011 |
| WO | 2013/049998 A1 | 4/2013 |
| WO | 2013/051886 A2 | 4/2013 |
| WO | 2013/184613 A2 | 12/2013 |
| WO | 2014163169 A1 | 10/2014 |

OTHER PUBLICATIONS

Notification of Reasons for Refusal dated Nov. 27, 2018 from the Japanese Patent Office in counterpart application No. 2017-564522.
3GPP TR 36.819, V.11.2.0 (Sep. 2013), Technical Report, 3rd Generation Partnership Project; Technical Specification Group Radio Access Network; Coordinated multi-point operation for LTE physical layer aspects (Release 11), Sep. 2013, pp. 1-70.
3GPP TS 36.213, V.12.5.0 (Mar. 2015), Technical Specification, 3rd Generation Partnership Project; Technical Specification Group Radio Access Network; Evolved Universal Terrestrial Radio Access (E-UTRA); Physical layer procedures (Release 12), Mar. 2015, pp. 1-239.
Written Opinion of the International Searching Authority of PCT/JP2016/002748 dated Sep. 19, 2016.
International Search Report of PCT/JP2016/002748 dated Sep. 19, 2016.

* cited by examiner

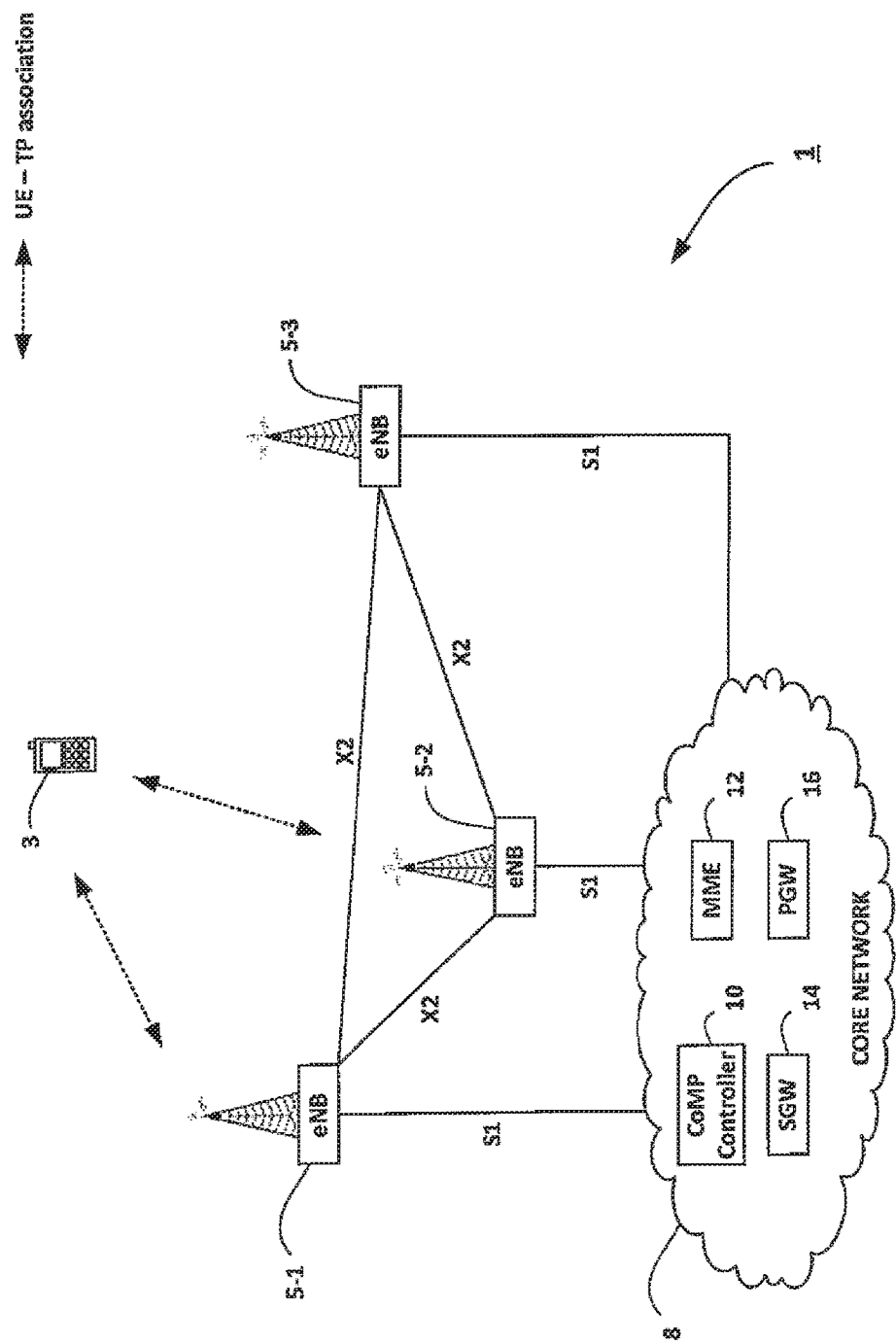
[Fig. 1]

[Fig. 4]
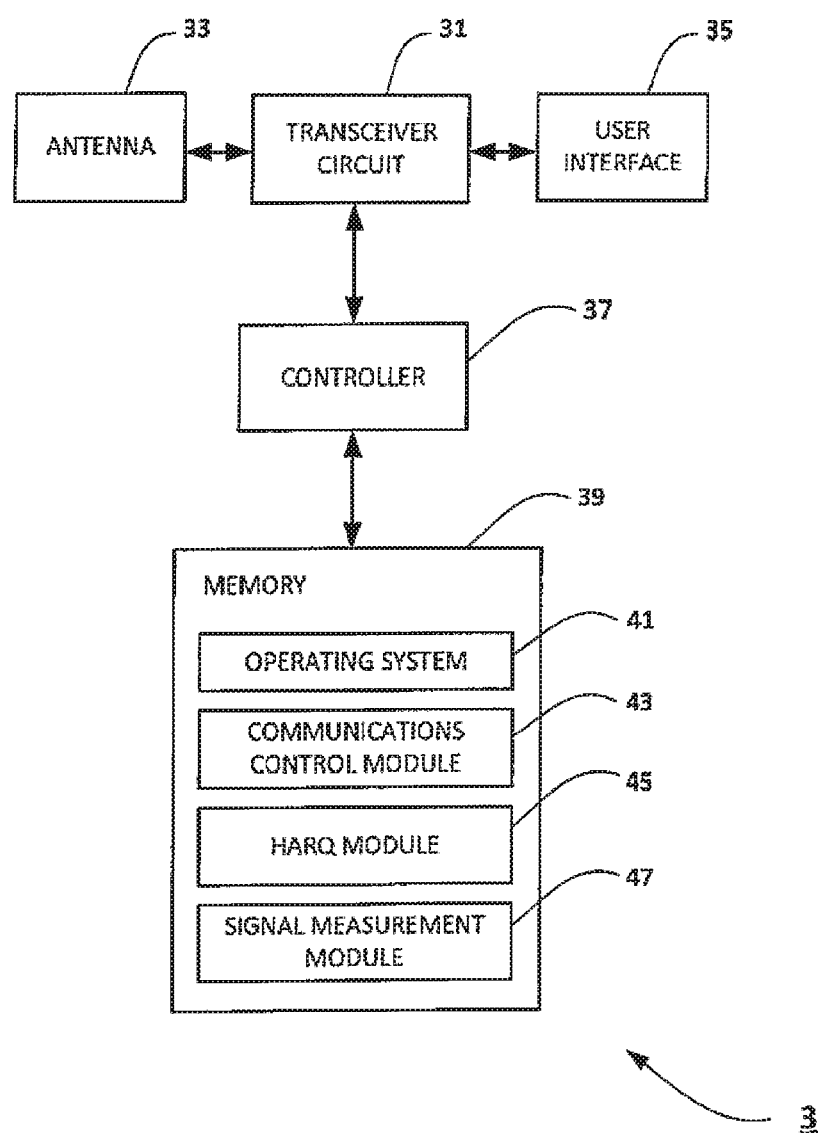

[Fig. 5]
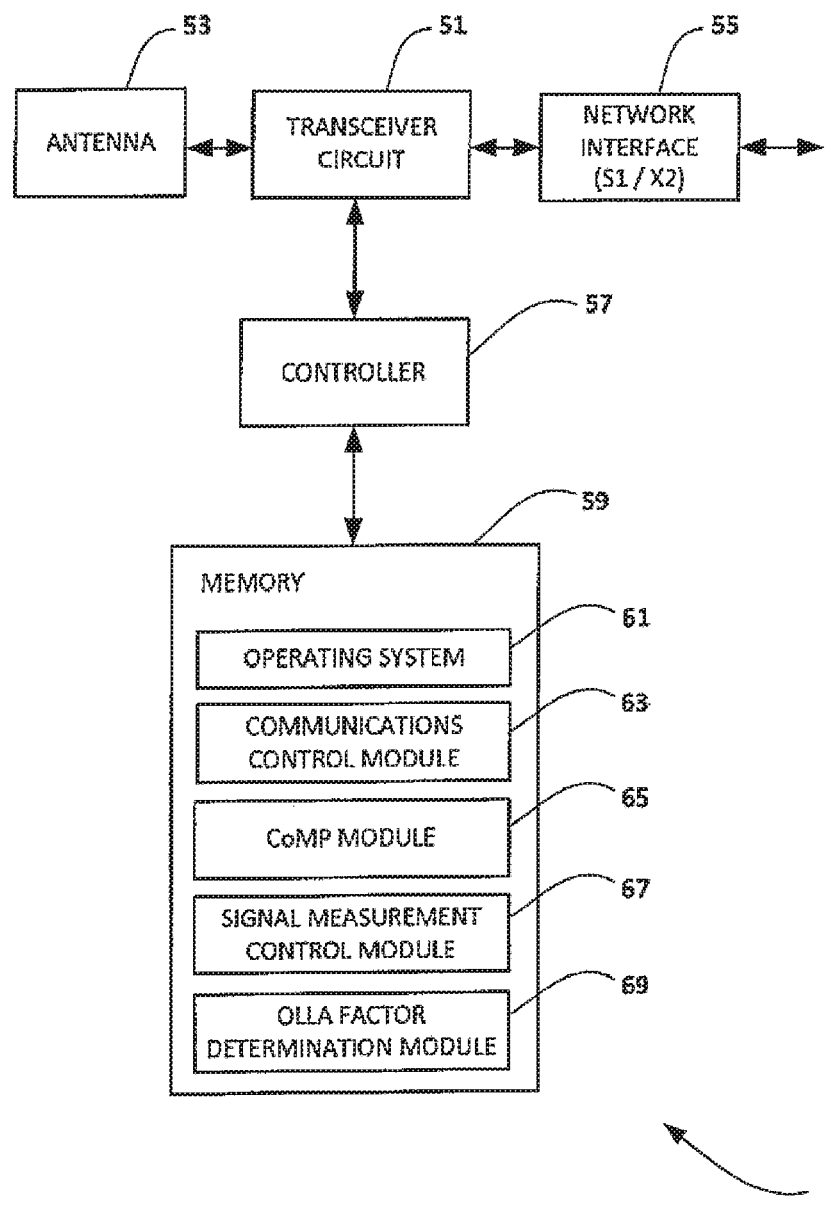

[Fig. 6]
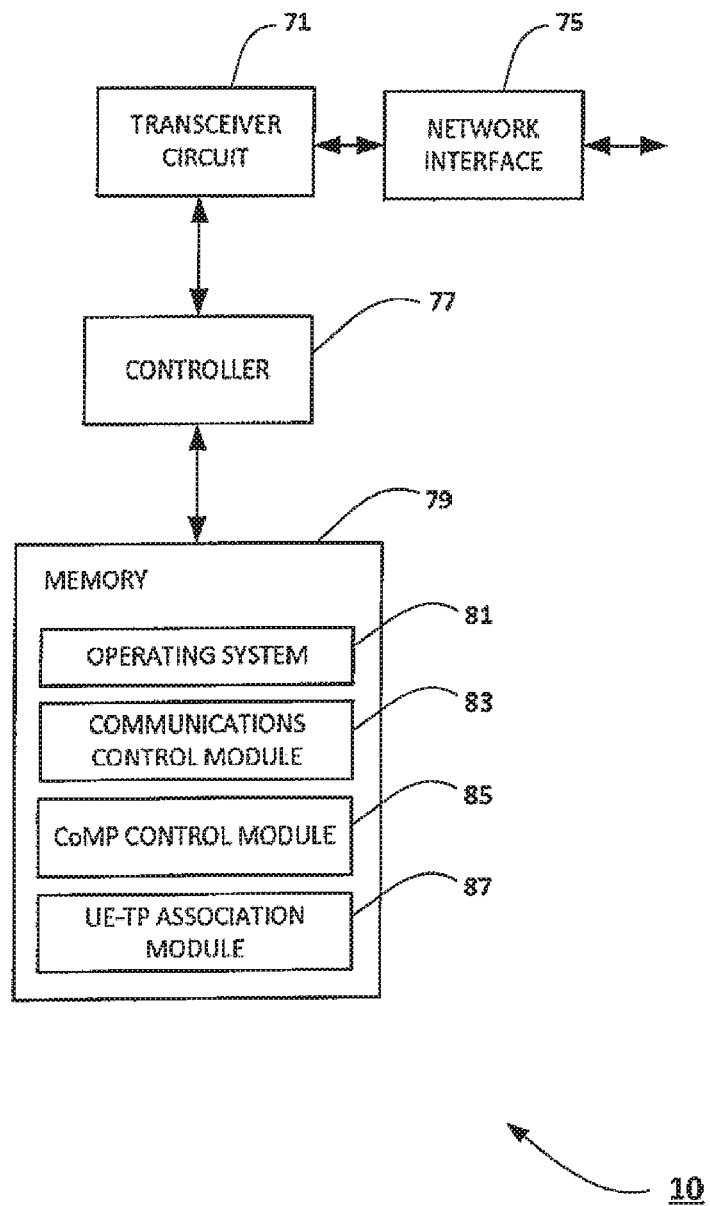

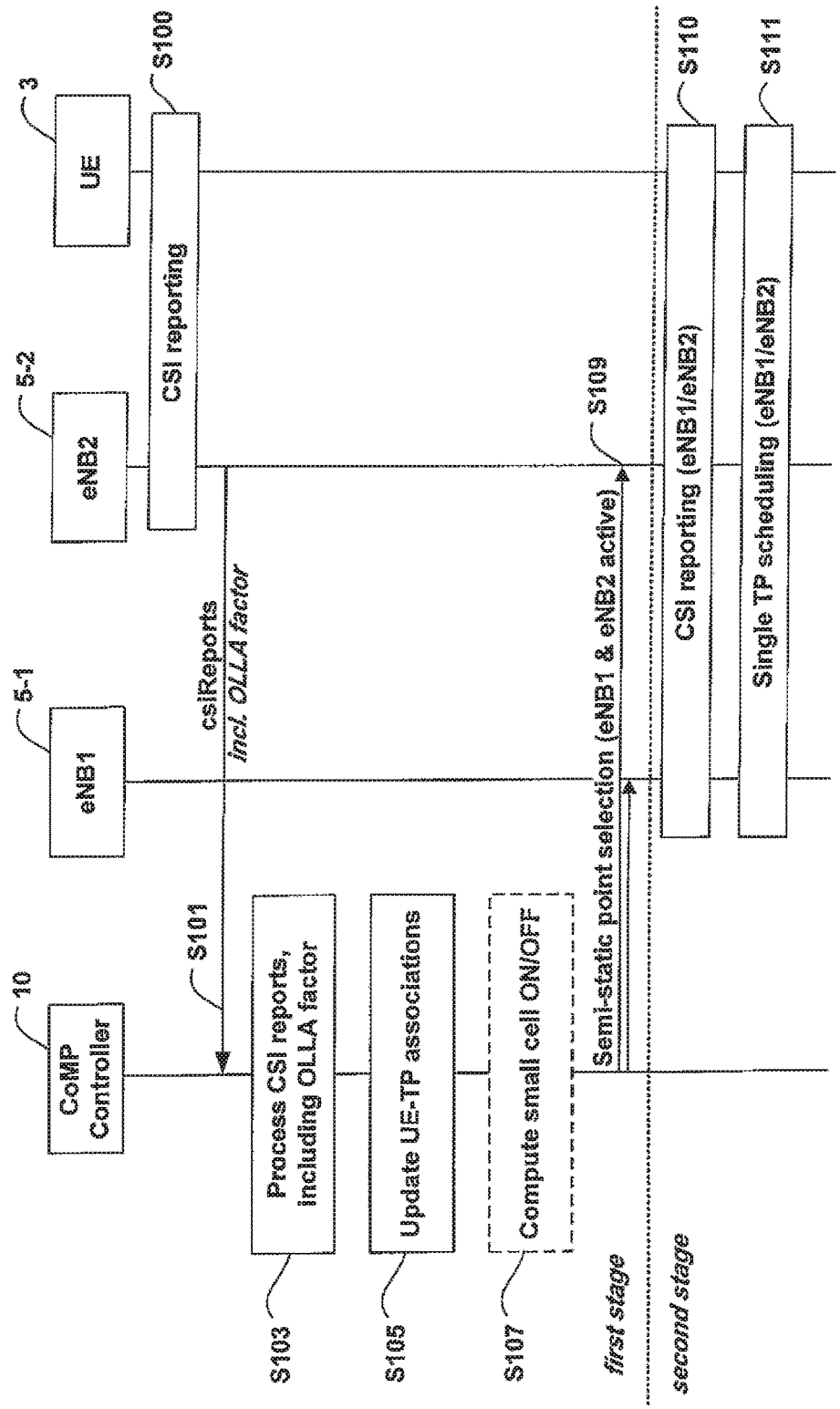

COMMUNICATION SYSTEM

CROSS REFERENCE TO RELATED APPLICATIONS

This application is a National Stage of Application No. PCT/JP2016/002748 filed Jun. 7, 2016, claiming priority based on British Patent Application No. 1510325.2 filed Jun. 12, 2015, the contents of all of which are incorporated herein by reference in their entirety.

TECHNICAL FIELD

The present invention relates to a communication system and to components thereof for providing communication services to mobile or fixed communication devices. The invention has particular, but not exclusive, relevance to the so-called Downlink Coordinated Multi-Point (CoMP) transmission/reception feature in Long Term Evolution (LTE) Advanced systems as currently defined in associated 3rd Generation Partnership Project (3GPP) standards documentation.

BACKGROUND ART

In a cellular communications network, user equipment (UE) (such as mobile telephones, mobile devices, mobile terminals, etc.) can communicate with other user equipment and/or remote servers via base stations. LTE systems include an Evolved Universal Terrestrial Radio Access Network (E-UTRAN) and an Evolved Packet Core (EPC) network (or simply 'core network'). The E-UTRAN includes a number of base stations ('eNBs') for providing both user-plane and control-plane terminations towards the UE.

Depending on various criteria (such as the amount of data to be transmitted, radio technologies supported by the mobile telephones, expected quality of service, subscription settings, etc.), each base station is responsible for controlling the transmission timings, frequencies, transmission powers, modulations, etc. employed by the mobile telephones attached to the base station. In order to minimise disruption to the service and to maximise utilisation of the available bandwidth, the base stations continuously adjust their own transmission power and also that of the mobile telephones. Base stations also assign frequency bands and/or time slots to mobile telephones, and also select and enforce the appropriate transmission technology to be used between the base stations and the attached mobile telephones. By doing so, base stations also reduce or eliminate any harmful interference caused by mobile telephones to each other or to the base stations.

A so-called Downlink Coordinated Multi-Point (CoMP) transmission/reception feature was introduced in Rel-11 of the 3GPP standards documentation to improve, for example, the coverage of high data rates for user equipment, temporary network deployment, cell edge throughput and/or to increase system throughput. The CoMP feature established techniques for compatible mobile telephones (and other user equipment) to communicate with multiple transmission points (TPs), substantially simultaneously. The TPs typically include: base stations (eNBs), remote radio heads (RRHs), relay nodes (RNs), and/or the like (or combination thereof). The transmission points involved in CoMP transmission may be provided in a number of ways including, for example: as separate transmission points of a single base station, each transmission point being associated with a different cell (referred to as 'intra-eNB CoMP'); as transmission points operated by different base stations (referred to as 'inter-eNB CoMP'), or using a combination of these two methods. These techniques are described in, for example, TR 36.819 V11.2.0, the contents of which are hereby incorporated by reference. In summary, CoMP transmission/reception may be used i) to optimise received signal quality at the mobile telephone by transmitting the same signal from multiple TPs and/or ii) to increase data throughput by sending different signals (e.g. different parts of the user data) from different TPs concurrently (but of course without causing interference, e.g. by using different frequencies/timing/codes/etc).

However, when multiple transmission points are used by the mobile telephone, it is often difficult to find an optimal combination of cells and to determine an optimum scheduling in each cell (i.e. that maximises data rate and/or avoids unnecessary interference). Furthermore, base stations are often connected via a so-called non-ideal backhaul, characterised by a relatively high latency and/or limited bandwidth, which often causes data transmitted between such base stations to suffer delays (sometimes 50 ms or more) that may inhibit efficient CoMP operation. CoMP scheduling algorithms typically require the exchange of large amounts of data between base stations (cells), which is not practical for (at least) inter-eNB CoMP transmission because of the above mentioned backhaul restrictions.

It has been proposed that CoMP scheduling can be performed in two distinct stages (at a radio frame level and at a sub-frame level, respectively) such that it requires only a limited coordination among TPs in the coordination area. It is therefore possible to realise CoMP scheduling using TPs connected via a non-ideal backhaul.

In the first stage, performed for each radio frame (which has a duration of 10 ms in LTE), a central controller selects which TP is to be made active for which UE (i.e. which TP is turned 'ON' during that radio frame). This is called associating between UEs and TPs. The first stage is performed periodically at a relatively coarse granularity based on averaged (not instantaneous) slowly varying metrics that are relevant for a period longer than the backhaul latency (typically ranging from 50 ms—equivalent to five LTE radio frames—to 100 ms or even greater). Thus, the metrics being used do not change significantly while the signals, from which the metrics are extracted, are being communicated via the backhaul. Examples of such slowly varying metrics include estimates of average rates that the users can receive from those TPs under different configurations and/or the like. Such metrics may be based, for example on relatively long-term measurements of reference received power (RSRP) made by each UE.

On the other hand, the second stage is performed for each sub-frame (having a duration of 1 ms in LTE) and/or each slot (0.5 ms) independently by each active TP based on fast changing information, such as instantaneous rate or signal-to-interference-plus-noise ratio (SINR) estimates, that is received directly by that TP from the mobile telephones associated to it. Therefore, the second stage does not require coordination between the TPs involved, at least until the end of the current radio frame (end of the first stage).

However, such an approach is not ideal because it may result in a sub-optimal CoMP configuration (UE-TP associations) being selected for the duration of several radio frames, which in turn may result in a poor overall data throughput and/or unwanted interference for the duration of the entire set of radio frames. Such a sub-optimal CoMP configuration cannot be compensated for (or alleviated by) the active TPs in the second stage (even if it is mainly caused by a single TP) because in the second stage the TPs are operating independently from each other and hence they can only change the parameters of their own transmission in each sub-frame (or slot).

SUMMARY OF INVENTION

Technical Problem

Accordingly, the present invention seeks to provide systems, devices and methods which at least partially address the above issues.

Solution to Problem

In one aspect, the invention provides apparatus for controlling coordinated transmissions, in a communication system comprising at least one mobile device and a plurality of transmission points, each transmission point operating at least one cell, the apparatus comprising: receiving means for receiving at least one Channel State Information, CSI, report from at least one transmission point of the plurality of transmission points; estimating means for estimating, based on information derived from the at least one CSI report, a data rate for transmission via the at least one transmission point; determining means for determining, based on the data rate estimated by the estimating means, an active transmission point set comprising at least one transmission point to be associated with the at least one mobile device; and sending means for sending, to each transmission point included in the active transmission point set, information identifying an association with the at least one mobile device.

In another aspect, the invention provides a transmission point of a communication system providing coordinated transmissions to at least one mobile device via a plurality of transmission points, each transmission point operating at least one cell, the transmission point comprising: first receiving means for receiving, from the at least one mobile device, at least one Channel State Information, CSI, report; sending means for sending, to a controller, the at least one CSI report for use in estimating, based on information derived from the at least one CSI report, a data rate for transmission via the transmission point; and second receiving means for receiving, from a network node, information identifying an association between the transmission point and the at least one mobile device.

In another aspect, the invention provides a system comprising the above described apparatus and the above described transmission point.

In another aspect, the invention provides a method performed by an apparatus in a communication system providing coordinated transmissions to at least one mobile device via a plurality of transmission points, wherein each transmission point is operating at least one cell, the method comprising: receiving at least one Channel State Information, CSI, report from at least one transmission point of the plurality of transmission points; estimating, based on information derived from the at least one CSI report, a data rate for transmission via the at least one transmission point; determining, based on the data rate estimated by the estimating, an active transmission point set comprising at least one transmission point to be associated with the at least one mobile device; and sending, to each transmission point included in the active transmission point set, information identifying an association with the at least one mobile device.

In another aspect, the invention provides a method performed by a transmission point in a communication system providing coordinated transmissions to at least one mobile device via a plurality of transmission points, wherein each transmission point is operating at least one cell, the method comprising: receiving, from the at least one mobile device, at least one Channel State Information, CSI, report; sending, to a controller, the at least one CSI report for use in estimating, based on information derived from the at least one CSI report, a data rate for transmission via the transmission point; and receiving, from a network node, information identifying an association between the transmission point and the at least one mobile device.

Aspects of the invention extend to computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently (or in combination with) any other disclosed and/or illustrated features. In particular but without limitation the features of any of the claims dependent from a particular independent claim may be introduced into that independent claim in any combination or individually.

Exemplary embodiments of the invention will now be described, by way of example only, with reference to the attached figures in which:

BRIEF DESCRIPTION OF DRAWINGS

FIG. 1 schematically illustrates a mobile telecommunication system of a type to which the invention is applicable;

FIG. 4 is a block diagram illustrating the main components of a mobile telephone forming part of the system shown in FIG. 1;

FIG. 5 is a block diagram illustrating the main components of the base station forming part of the system shown in FIG. 1;

FIG. 6 is a block diagram illustrating the main components of the central controller forming part of the system shown in FIG. 1; and FIG. 7 is an exemplary timing diagram illustrating a method performed by components of the mobile telecommunication system of FIG. 1 whilst carrying out an exemplary embodiment of the invention.

DESCRIPTION OF EMBODIMENTS

Overview

Figure 2A:
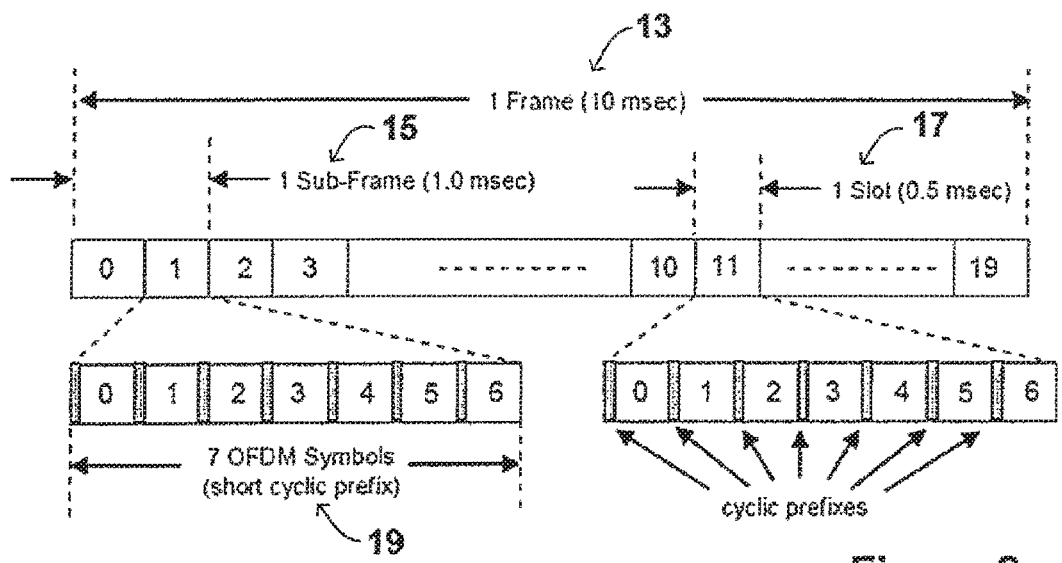
FIG. 2a illustrates a generic frame structure defined for use in the LTE communication network and FIG. 2b illustrates the way in which a slot illustrated in FIG. 2a is formed of a number of time-frequency resources.

FIG. 1 schematically illustrates a mobile (cellular) telecommunication system 1 including a mobile telephone 3 (or other compatible user equipment) served via the cells of a plurality of transmission points (in this example base stations) 5-1 to 5-3. The base stations 5 are connected to each other via a so-called X2 interface (either directly or via an appropriate gateway). As those skilled in the art will appreciate, whilst one mobile telephone 3 and three base stations 5 are shown in FIG. 1 for illustration purposes, the system, when implemented, will typically include other base stations and mobile telephones.

The telecommunication system 1 also comprises a core network 8. The base stations 5 are connected to the core network 8 via an S1 interface. The core network 8 comprises, amongst other things, a CoMP controller 10, a mobility management entity (MME) 12, a serving gateway (SGW) 14 and a Packet Data Network (PDN) Gateway (PGW) 16.

As will be understood by those skilled in the art, each base station 5 operates one or more base station cells (not shown) in which communications can be made between the base station 5 and the mobile telephone 3. A user of the mobile telephone 3 can communicate with other users and/or remote servers via the base station 5 and the core network 8.

When multiple transmission points are used by the mobile telephone 3, it is configured to measure and report the quality of the signals transmitted by each transmission point (each cell) and also to measure and report back any interference experienced so that each transmission point can adjust its operation accordingly (i.e. to be able to transmit at/near an optimum power level and to keep interference to a minimum).

In the example shown in FIG. 1, the first and second base stations 5-1, 5-2 are currently active for the mobile telephone 3 (i.e. the CoMP controller 10 created appropriate UE-TP associations between: the mobile telephone 3 and the first base station 5-1; and between the mobile telephone 3 and the second base station 5-2). Therefore, the mobile telephone 3 measures and reports the quality of the respective signals transmitted by each associated base station 5-1, 5-2 (active TPs) and/or any interference affecting such signals (although the mobile telephone 3 may also be configured to measure and report the quality of the signals transmitted by base station 5-3).

Advantageously, the periodicity at which the UE-TP associations are updated is less than the corresponding (e.g. an average) backhaul latency introduced by the non-ideal backhaul (X2 interface) provided between the base stations 5. Specifically, in this system, UE-TP associations are updated by the CoMP controller 10 at least once every radio frame but typically more frequently than once for every radio frame, for example every few sub-frames.

To facilitate this, in this example, the UE-TP associations are based on short-term CoMP channel state information (CSI) reports rather than relatively longer term measurements (such as RSRP measurements) on which are based estimates of averaged (non-instantaneous) slowly varying metrics that are relevant for a period longer than the backhaul latency.

Specifically, the CoMP controller 10 is configured to estimate a data rate for the mobile telephone 3 from the CSI report(s) sent by the mobile telephone 3 to its serving base station(s) 5 (instead of estimating a slow varying average UE data rate from RSRP measurements). In order to do so, each base station 5 (TP) is configured to send the CSI report(s) that it receives from the mobile telephone 3 to the central processor. It will be appreciated that if more than one mobile telephone is being served in the cells of the base stations 5, each mobile telephone is configured to send its own CSI report, which is then forwarded to the CoMP controller 10 by the appropriate serving base station that received the CSI report. It will be appreciated that the base stations may forward the CSI reports from the served mobile telephones either individually, or in an aggregated form. Furthermore, the base stations may forward the CSI reports either in the original format or following an appropriate processing (e.g. encoding).

Beneficially, the data rate estimate is improved based on a dynamic correction term derived by the serving base station 5 for the mobile telephone 3 (which correction term is also forwarded by the base station 5 to the CoMP controller 10). In this example the correction term is a correction term obtained from Outer-Loop Link Adaptation (OLLA) driven by hybrid automatic repeat request (HARQ) ACK/NACK feedback from the mobile telephone 3. The OLLA correction term (or 'OLLA factor') changes dynamically over time based on the number of ACKs and the number of NACKs and thus allows the data rate estimate to be improved based on the dynamics of ACK/NACK receptions for past data transmissions.

In the second stage, each base station 5-1 and 5-2 (i.e. the TPs associated to the mobile telephone 3 in the first phase) performs sub-frame-by-sub-frame scheduling in its cell(s) independently (or performs slot-by-slot scheduling, if appropriate). Such an independent scheduling greatly reduces the amount of data that needs to be transferred between cells, making it suitable for CoMP with non-ideal backhaul connections.

Beneficially, the improved two-stage scheduling described above makes it possible to perform CoMP scheduling without requiring extensive coordination, in either stage, between the TPs involved. The described CoMP scheduling also allows performing the first stage at a rate higher than once for every radio frame (regardless of the backhaul latency between neighbouring base stations). The CoMP scheduler is advantageously able to improve data rate estimates (and hence select the most optimal set of active TPs for each scheduled mobile telephone) by using a correction term provided by the mobile telephone(s) being scheduled.

LTE Sub-Frame Data Structure

Before discussing the specific ways in which CoMP transmissions can be scheduled for the mobile telephone 3 via multiple transmission points, a brief description will be given of the access scheme and a general frame structure agreed for LTE communications. An Orthogonal Frequency Division Multiple Access (OFDMA) technique is used for the downlink to allow the mobile telephone 3 to receive data over the air interface with the base station 5. Different sub-carriers are allocated by the base station 5 (for a predetermined amount of time) to the mobile telephone 3 depending on the amount of data to be sent to the mobile telephone 3. These blocks of sub-carriers are referred to as physical resource blocks (PRBs) in the LTE specifications. PRBs thus have a time and frequency dimension. The (each) serving base station 5 dynamically allocates PRBs for each device that it is serving and signals the allocations for each sub-frame (TTI) to each of the scheduled devices in a control channel.

Figure 2B:
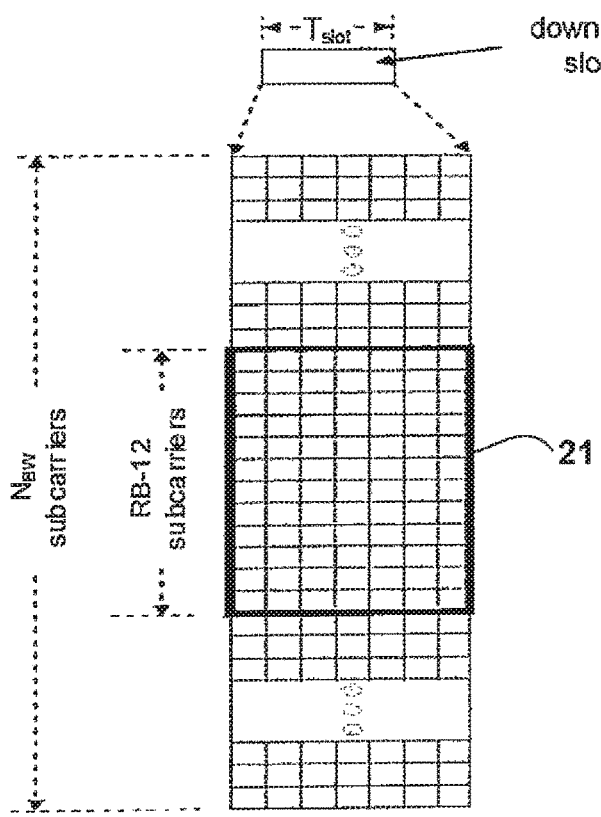

FIG. 2a illustrates one generic frame structure agreed for LTE communications over the air interface between the mobile telephone 3 and its serving base station(s) 5. As shown, one frame 13 is 10 ms long and comprises ten sub-frames 15 of 1 ms duration (known as a Transmission Time Interval (TTI)). Each sub-frame or TTI comprises two slots 17 of 0.5 ms duration. Each slot 17 comprises either six or seven OFDM symbols 19, depending on whether the normal or extended cyclic prefix (CP) is employed. The total number of available sub-carriers depends on the overall transmission bandwidth of the system. The LTE specifications define parameters for system bandwidths from 1.4 MHz to 20 MHz and one PRB is currently defined to comprise 12 consecutive subcarriers for one slot 17 (although this could clearly be different). The transmitted downlink signal comprises NBW subcarriers for a duration of Nsymb OFDM symbols. It can be represented by a resource grid as illustrated in FIG. 2*b*. Each box in the grid represents a single sub-carrier for one symbol period and is referred to as a resource element (RE). As shown, each PRB 21 is formed from twelve consecutive sub-carriers and (in this case) seven symbols for each subcarrier; although in practice the same allocations are made in the second slot 17 of each sub-frame 15 as well.

In the case of carrier aggregation, multiple carriers are provided, each having the frame structure illustrated in FIGS. 2*a* and 2*b*, but separated in frequency so that they do not interfere.

Some of the resource elements are configured to carry the reference signals used for signal quality measurements. Similarly, some of the resource elements can be transmitted at zero power level for facilitating interference measurements. A so-called CSI process informs the mobile telephone 3 which resource elements of which carriers are currently configured to carry the reference signals/zero power signals to be measured and reported. In addition, the mobile telephone 3 may also be configured to derive (and report) the applicable OLLA factor (e.g. per base station and/or cell) based on HARQ feedback (ACK/NACK) from earlier transmissions between the mobile telephone 3 and its serving base station(s) 5.

In this exemplary embodiment, the base stations 5 are arranged to be able to communicate with the mobile telephone 3 as a number of coordinated transmission points. Optionally, one or more of the base stations 5 may be configured to provide aggregated component carriers. The transmission points (TPs)—the base stations 5 in the embodiments, co-operate together to co-ordinate their multi-point transmissions. Typically, different sets of co-ordinating transmission points will be provided within the communications system. A number of different multi-point transmission modes are possible, as follows:

1. Joint Transmission (JT). In this case the mobile telephone 3 receives transmissions from multiple transmission points (TPs) on a time-frequency resource (such as on a PRB on a sub-frame). These transmissions may be carrying the same data (such that the signals from each TP can be combined by the mobile telephone 3 and thereby improve the quality of the received signal) or different data (such that more data per time-frequency resource is sent to the mobile telephone 3) from the TPs.
2. Coordinated scheduling/beam forming (CS/CB). In this case the mobile telephone 3 receives transmissions from only one TP on any one time-frequency resource, and the TPs co-ordinate their scheduling and/or beam forming decisions to minimise interference between the transmissions. The transmitting points that are used are chosen semi-statically—such that they change relatively infrequently.
3. Dynamic Point Selection (DPS). In this case the mobile telephone 3 receives transmissions on a time-frequency resource from only one TP selected from the set of co-ordinating transmission points; but the selected TP may change rapidly (from one sub-frame to another) based on the instantaneous radio channel conditions between the mobile telephone 3 and the transmission points.

Depending on the number of transmission points, and whether any of the base stations 5 implement carrier aggregation functionality, there are a number of cells that need to be measured and reported by the mobile telephone 3 in order to assist the serving base station(s) 5 in optimising signal conditions within the cells of the communication system 1.

In this exemplary embodiment, each serving base station 5 (e.g. base stations 5-1 and 5-2) configures the mobile telephone 3 to measure and report the CSI of a set of reference resources (zero power and/or non-zero power resources). This is referred to as a CSI process.

The transmission point that configured that CSI process receives the results of the measurements and uses the results in its own scheduling decisions (in stage two) for that mobile telephone 3. However, as described above, in this system the base stations 5 are also configured to forward the results of the measurements (including the associated OLLA factor) to the CoMP controller 10 as well, and the OLLA factor may also be used by the CoMP controller 10 in deciding which TP to be active for which mobile telephone in the first stage (UE-TP association stage).

Although not shown in FIG. 1, the telecommunication system 1 may also comprise one or more Remote Radio Heads (RRHs) and/or relay nodes (RNs) in addition to (or instead of any of) the base stations 5-1 to 5-3. If present, the main difference between 'regular' base stations 5-1 to 5-3 and any RRH or relay node is that RRHs and relay nodes are not connected to the core network 8 directly. Instead, the RRH is typically connected to a master (or 'donor') base station by a high speed communication link whilst relay nodes are typically connected to a donor base station via an air interface. The RRH and the RN may either act just like a remote antenna of the base station—such that the signals broadcast by the RRH/RN are the same as those broadcast by its donor base station (e.g. the RRH/RN may use the same cell ID as the 'donor' base station's cell) or may act as a base station itself serving user equipment within its own cell (which in this case may have a different cell ID to that of the cell of the 'donor' base station).

CoMP transmission schemes can be generally classified to belong to one (or a combination) of the following four main scenarios:

1. Homogeneous network with intra-site (i.e. intra base station) CoMP;
2. Homogeneous network with high transmit (Tx) power Remote Radio Heads (RRHs);
3. Heterogeneous network with low power RRHs within the coverage area of a macrocell (e.g. a base station cell) where the transmission/reception points created by the RRHs have different cell identities than the macro cell; and
4. Heterogeneous network with low power RRHs within the coverage area of macrocell (e.g. a base station cell) where the transmission/reception points created by the RRHs have the same cell identity as the macro cell.

Figure 3B:
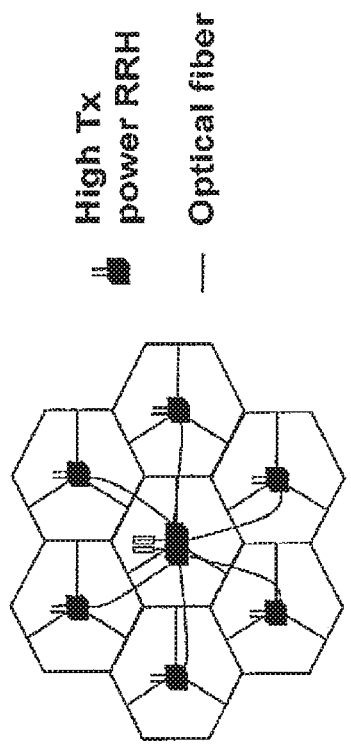
FIGS. 3a, 3b and 3c schematically illustrate different mobile telecommunication system scenarios having multiple, coordinated network transmission points.
Figure 3C:
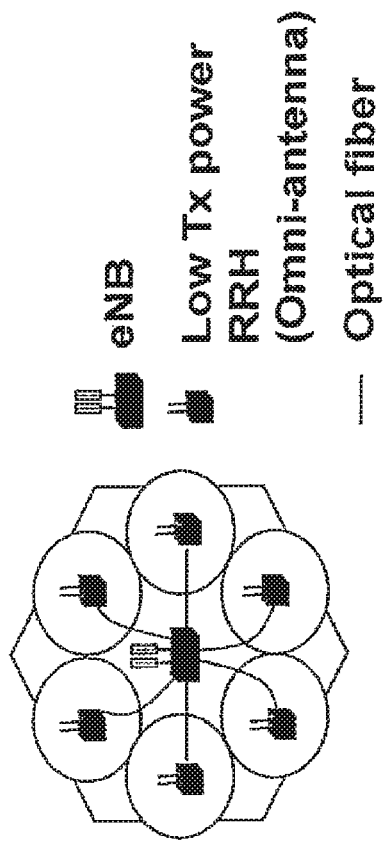
Figure 3A:
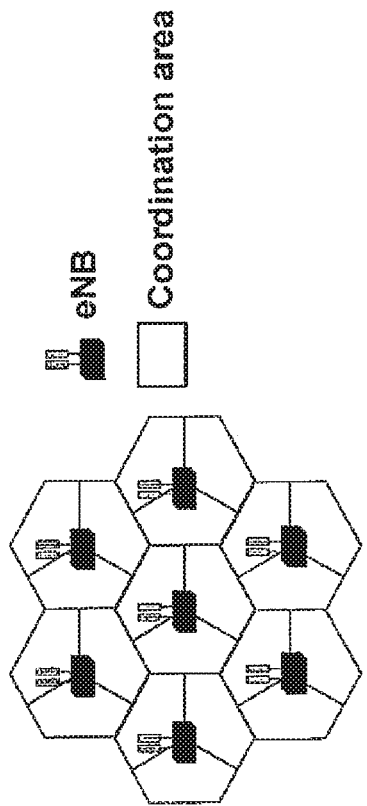

FIGS. 3*a* to 3*c* schematically illustrate examples of the main CoMP transmission scenarios for the provision of multiple, coordinated network transmission points.

FIG. 3*a* shows an example for implementing a homogeneous network with intra-site CoMP (scenario 1). In this case, the middle base station may be configured to perform coordination of multi-point transmissions (by this and any neighbouring base stations) within the geographical area defined by the coordinating base station's cells. When transmissions are coordinated between neighbouring base stations, throughput and/or signal quality along the common cell edge can be improved.

FIG. 3b shows an example for implementing a homogeneous network with high Tx power RRHs, controlled by a single base station (scenario 2). In this case, the remote radio heads are connected to the master base station (shown in the middle) via high-speed optical fiber links. Such arrangement allows the master base station to perform coordination of multi-point transmissions even beyond the geographical area of its cells.

FIG. 3c shows an example for implementing either one of scenario 3 or 4 above. In this case, a heterogeneous network is shown with low power RRHs within the coverage area of a macrocell (e.g. a master base station cell). The transmission/reception points created by the RRHs may have different cell identities than the macro cell (scenario 3) or have the same cell identity as the macro cell (scenario 4). The remote radio heads are connected to the master base station (shown in the middle) via high-speed optical fiber links, as above. However, in these scenarios, rather than extending the coordinated geographical area as above, the number of radio cells (and hence the available bandwidth) within the geographical area of the master base station's cell(s) is multiplied.

Relay nodes can be deployed and used to provide additional coverage and/or additional transmission points in generally the same manner as the RRHs shown in FIG. 3b. However, relay nodes are typically connected to their respective master base stations (called 'donor base stations') using a wireless link (an air interface) rather than an optical fiber link.

Mobile Telephone

FIG. 4 is a block diagram illustrating the main components of the mobile telephone 3 shown in FIG. 1. As shown, the mobile telephone 3 has a transceiver circuit 31 that is operable to transmit signals to and to receive signals from a base station 5 via one or more antenna 33. The mobile telephone 3 has a controller 37 to control the operation of the mobile telephone 3. The controller 37 is associated with a memory 39 and is coupled to the transceiver circuit 31. Although not necessarily shown in FIG. 4, the mobile telephone 3 may of course have all the usual functionality of a conventional mobile telephone 3 (such as a user interface 35) and this may be provided by any one or any combination of hardware, software and firmware, as appropriate. Software may be pre-installed in the memory 39 and/or may be downloaded via the telecommunications network or from a removable data storage device (RMD), for example.

The controller 37 is configured to control overall operation of the mobile telephone 3 by, in this example, program instructions or software instructions stored within memory 39. As shown, these software instructions include, among other things, an operating system 41, a communications control module 43, a HARQ module 45, and a signal measurement module 47.

The communications control module 43 is operable to control the communication between the mobile telephone 3 and the base station(s) 5. The communications control module 43 also controls the separate flows of uplink data and control data that are to be transmitted to the base station 5. When CA services are in use, the communications control module 43 is operable to control communications via the aggregated primary and secondary component carriers. When CoMP services are in use, the communications control module 43 is operable to control coordinated communications between the mobile telephone 3 and the multiple transmission points.

The HARQ module 45 is responsible for handling (generating/sending/receiving) hybrid automatic repeat request acknowledgements (ACKs) and/or negative acknowledgements (NACKs) for data packets transmitted between the mobile telephone 3 and its serving base station(s) 5. Using the ACK/NACK feedback (e.g. history and/or statistics thereof) provided by the HARQ module 45, each serving base station is able to calculate and maintain, an appropriate OLLA factor for transmissions for the mobile telephone 3 in a particular cell.

The signal measurement module 47 is operable to carry out signal measurements to determine an indication of signal quality/interference experienced by the mobile telephone 3. The measurement module 47 is also operable to provide the results of such measurements (CSI processes) to the serving base station(s) 5 (via the transceiver circuit 31).

Base Station

FIG. 5 is a block diagram illustrating the main components of a base station 5 shown in FIG. 1. The base station 5 is a communications node providing services to user equipment (such as mobile telephone 3) within its coverage area. In the exemplary embodiments according to the invention, communications between the various base stations 5 (transmission points) and the mobile telephone 3 are coordinated. As shown, the base station 5 includes a transceiver circuit 51 which transmits signals to, and receives signals from, the mobile telephone 3 via at least one antenna 53. The base station 5 also transmits signals to and receives signals from the core network 8 and other neighbouring base stations 5 via a network interface 55 (X2 interface for communicating with neighbouring base stations 5 and S1 interface for communicating with the core network 8). The operation of the transceiver circuit 51 is controlled by a controller 57 in accordance with software stored in memory 59. The software includes, among other things, an operating system 61, a communications control module 63, a CoMP module 65, a signal measurement control module 67, and an OLLA factor determination module 69.

The communications control module 63 is operable to control communications between the base station 5 and the mobile telephone 3, and the core network devices.

The CoMP module 65 facilitates coordination of multipoint transmissions between the cell(s) of this base station 5 and the mobile telephone 3 served by this base station (and any further base station). In doing so, the CoMP module 65 communicates with the CoMP controller 10, for example: sends the measurement results (including the CSI reports and/or any associated OLLA factor) obtained from communications with the user equipment (e.g. the mobile telephone 3) served by this base station 5; and receives UE-TP association (derived by the CoMP controller 10 based on the measurement results) to be used in the second stage of the current scheduling round. If appropriate, the CoMP module 65 may also communicate with corresponding modules of other base stations to ensure that coordination is maintained between the various base stations and may also assist the communication control module 63 to carry out control of communications using CoMP services.

The signal measurement control module 67 is operable to configure CSI processes (signal quality indication and interference related measurements and reporting, including calculation and reporting of an associated OLLA factor) for the mobile telephones 3 served by this base station 5. The signal measurement control module 67 is also operable to monitor (e.g. via the CoMP module 65) whether or not any cell of the base station 5 is involved in provision of CoMP services (and for which UE), and to configure CSI processes for the mobile telephones 3 accordingly.

The OLLA factor determination module 69 calculates and maintains, using feedback from the mobile telephone 3 (such as HARQ ACK/NACK feedback), an appropriate OLLA factor for the mobile telephone 3.

CoMP Controller

FIG. 6 is a block diagram illustrating the main components of the CoMP controller 10 shown in FIG. 1. The CoMP controller 10 is a communications node responsible for co-ordinating and scheduling CoMP transmissions to user equipment or the mobile telephone 3 using a plurality of transmission points. As shown, the CoMP controller 10 includes a transceiver circuit 71 which transmits signals to, and receives signals from, the base stations 5 via a network interface 75 (e.g. an X2 interface). The operation of the transceiver circuit 71 is controlled by a controller 77 in accordance with software stored in memory 79. The software includes, among other things, an operating system 81, a communications control module 83, a CoMP control module 85, and a UE-TP association module 87.

The communications control module 83 is operable to control communications between the CoMP controller 10 and the base stations 5 and/or other nodes (e.g. core network nodes) if appropriate.

The CoMP control module 85 coordinates multi-point transmissions between the cell(s) of base stations 5 connected to the CoMP controller 10 and user equipment served by such base stations 5. In doing so, the CoMP control module 85 communicates with the base stations 5. For example, the CoMP control module 85 receives measurement results (including the associated OLLA factor) obtained by the base stations 5 from served user equipment (e.g. the mobile telephone 3). The CoMP control module 85 sends, to the appropriate base stations 5, information identifying the applicable UE-TP association(s) (derived by the UE-TP association module 87) to be used in the second stage of the current CoMP scheduling round.

The UE-TP association module 87 determines, based on the measurement results (including any OLLA factor, if present) received from the base stations 5, the applicable UE-TP association(s) to be used in the second stage of the currently processed CoMP scheduling round. The UE-TP association module 87 informs the CoMP control module 85 about the applicable UE-TP association(s) and/or any change of such UE-TP association(s) since the previous CoMP scheduling round.

In the above description, the mobile telephone 3, the base station 5, and the CoMP controller 10 are described for ease of understanding as having a number of discrete modules (such as the communications control modules, the CoMP modules, and the signal measurement module). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

A number of different exemplary embodiments will now be described that illustrate how the invention can be put into effect using the mobile telephone 3, base stations 5 (as exemplary transmission points), and the CoMP controller 10 of FIG. 1.

Operation

FIG. 7 is an exemplary timing diagram illustrating a method performed by components of the mobile telecommunication system 1 of FIG. 1 whilst carrying out a two-stage scheduling for CoMP transmissions.

In this example, CoMP scheduling is realised using a plurality of TPs (base stations 5) selected from a cluster of TPs. The CoMP scheduling is performed in two stages:
1) A UE-TP association stage (referred to as 'first stage' hereafter) in which each UE (such as the mobile telephone 3) is assigned to one or more TPs (base stations 5) in the cluster by the CoMP controller 10 (a central CoMP processor). The cell association update period is typically of the order of 1 ms to 10 ms (although longer update periods may also be used).
2) A TP scheduling stage (referred to as 'second stage' hereafter), performed every sub-frame (or every slot), in which each TP in the cluster independently assigns resources to the UEs assigned to that TP in the first stage.

The first stage is generally illustrated in steps S100 to S109, and the second stage is illustrated in steps S110 and S111.

In more detail, the overall process begins in step S100, in which the mobile telephone 3 and the base station 5-2 serving the mobile telephone 3 perform an appropriate CSI process (or a plurality of CSI processes). The details of such CSI processes (configuration, measurement, and reporting thereof) are described in section 7.2 of 3GPP TS 36.213 version 12.5.0, the contents of which are incorporated herein by reference.

In summary, the serving base station 5-2 requests (using its signal measurement control module 67) the mobile telephone 3 to carry out appropriate signal measurements (over predetermined reference resources). Effectively, the mobile telephone 3 becomes configured to perform, in response to each such CSI process, periodic and/or aperiodic CSI reporting. Therefore, using its signal measurement module 47, the mobile telephone 3 performs the requested measurements on the appropriate resources indicated by the given CSI process, and sends a so-called 'CSI report' to the base station 5-2, which includes the results of the measurements. Communication between the base station 5-2 and the mobile telephone 3 relating to the CSI process may be realised using appropriately formatted RRC messages and/or the like (not shown in FIG. 7).

In this example, at the end of each CSI process (or at the end of a reporting period defined for that CSI process), the mobile telephone 3 generates and sends and appropriately formatted (RRC) message to the base station 5-2, and includes in the message information identifying the current channel state for the cell(s) of the serving base station 5-2. The mobile telephone 3 determines and reports to the serving base station 5-2 the relevant current channel state for each cell of the serving base station 5-2 for which such channel state indication was requested. Beneficially, based on the mobile telephone's 3 channel state indication (CSI) at step S100 and based on actual transmissions between the mobile telephone 3 and the serving base station 5-2 in the reported cell(s), the serving base station 5-2 is able to derive a respective OLLA factor parameter for each reported cell. Effectively, such an OLLA factor parameter (which is derived based on HARQ ACK/NACK transmissions) informs the serving base station 5-2 about a respective correction to be applied to the data rate indicated by the CSI for that cell. Advantageously, the OLLA factor allows the serving base station 5-2 (and also the CoMP controller 10) to arrive at a more realistic data rate than by considering the CSI alone (which is derived from signal measurements only rather than from actual transmissions).

In step S101, the base station 5-2 generates and sends an appropriately formatted signalling message to the CoMP controller 10 and includes in this message the OLLA factor(s) derived (in step S100) for the mobile telephone 3 in the base station's 5-2 cell(s). It will be appreciated that if the CoMP controller 10 is configured to manage more than one mobile telephone, each mobile telephone sends its own CSI report to its serving base station, which is then forwarded (in step S101) to the CoMP controller 10 by the serving base station that received the CSI report (along with any associated OLLA factor value). In other words, steps S100 and S101 may be performed with respect to each (active) transmission point, if appropriate. Each CSI report includes, amongst others, information identifying a wideband channel quality indicator (CQI) value and/or the maximum sub-band CQI value measured by the mobile telephone 3 for a particular cell (or TP).

As generally shown in step S103, the CoMP controller 10 (using its CoMP control module 85) processes the received CSI reports (including the CQI and/or OLLA factor values included therein) in order to optimise the CoMP transmissions for the current scheduling round. Specifically, the CoMP control module 85 estimates the current respective data rate for each UE (e.g. the mobile telephone 3) by converting the reported wideband CQI and/or the maximum reported sub-band CQI to a data rate using a suitable formula or look-up-table (after applying the OLLA correction).

Using the estimated data rates, the CoMP controller 10 updates, using its UE-TP association module 87, the UE-TP associations for the current CoMP scheduling round (step S105). Optionally, as shown in step S107, the CoMP controller 10 may also determine whether one or more cells (e.g. 'small cells') are to be turned off for the current scheduling round, which may result in a reduced interference from such turned off cell(s).

Next, as generally shown in step S109, the CoMP controller 10 generates and sends, to each TP controlled by this CoMP controller 10, an appropriately formatted signalling message for configuring a semi-static selection of transmission points for the current scheduling round. In other words, the CoMP controller 10 selects which transmission point(s) to be active for which user equipment in the second stage of the current CoMP scheduling round. The CoMP controller's 10 message includes information (e.g. an appropriately formatted information element) identifying which transmission point(s) to be active for which user equipment in the second stage. In this example, the CoMP controller 10 selected and informed base stations 5-1 and 5-2 as active transmission points for the mobile telephone 3 in the second stage of the current CoMP scheduling round.

In the second stage, generally illustrated in steps S110 and S111, each active base station 5-1 and 5-2 (i.e. each TP that have been associated to the mobile telephone 3 in step S105) performs sub-frame-by-sub-frame (or slot-by-slot) scheduling in its cell(s) independently from other active TPs.

Specifically, as generally shown in step S110, the active transmission points (in this example, base stations 5-1 and 5-2) configure appropriate CSI reporting for the mobile telephone 3 and obtain CSI report(s) from the mobile telephone 3 to assist their own scheduling decisions. It will be appreciated that the CSI reports obtained in step S110 may comprise the same CSI report(s) as the one(s) obtained in step S100, although they may also comprise different (e.g. updated/more recent/more detailed) CSI reports, if appropriate.

As shown in step S111, in the second stage, each active transmission point carries out scheduling for the mobile telephone 3 independently from the other active transmission point(s). Step S111 may be performed for each sub-frame (or, alternatively, in each slot), for the duration of the current CoMP scheduling round (i.e. until the first stage starts again). It will be appreciated that the CSI reports obtained in step S110 may form part of (or may be used in generating) the CSI reports forwarded to the CoMP controller 10 when the first stage is performed again (when step S101 is repeated). It will also be appreciated that the transmissions scheduled for the mobile telephone 3 in step S111 may be used when generating (or when updating) the OLLA factor for the mobile telephone 3 that is forwarded to the CoMP controller 10 when the first stage is performed again (when step S101 is repeated).

The main benefit of the above described two-stage CoMP scheduling is a potential reduction in complexity compared to a conventional CoMP scheduler that performs scheduling for all TPs globally in every sub-frame. This complexity reduction is particularly beneficial in the case of inter-eNB CoMP, in which case the communication bandwidth between TPs may be limited. Advantageously, the above described UE-TP association (step S105) does not require communication between TPs and hence it is not affected by (or it is less likely to be affected by) any backhaul latency present between the base stations 5. However the method may also be applied to intra-eNB CoMP, in which case some benefits may be achieved through, for example, simplification of the base station architecture.

Beneficially, the above two-stage CoMP scheduling provides robustness against inaccurate CSI reports by the inclusion of the OLLA parameter. In other systems, inaccurate CSI information (e.g. due to latency caused by the non-ideal backhaul between base stations) may lead to worse performance when using CoMP than non-CoMP single-TP scheduling. However, the above two-stage approach (which relies on single-TP scheduling in the second stage) is much more robust against such inaccuracies caused by backhaul delay.

Modifications and Alternatives

Detailed exemplary embodiments have been described above. As those skilled in the art will appreciate, a number of modifications and alternatives can be made to the above exemplary embodiments whilst still benefiting from the inventions embodied therein.

In the above exemplary embodiments, the base stations (or RRHs/RNs) are described as transmission points. However, the term 'transmission point' shall not be construed as being limited to network nodes that are actually transmitting user data to CoMP enabled mobile telephones—they may only transmit control data, such as reference signals and the like.

In the above exemplary embodiments, the CoMP controller node was described as a core network node. However, it will also be appreciated that the CoMP controller may be located in the radio access network (EUTRAN). For example, the CoMP controller may be co-located with and/or coupled to one (or more) of the base stations. In this case, the CoMP controller and the base station(s) may be coupled at Layer3/Layer2, as appropriate.

In the above exemplary embodiments, a standalone CoMP controller node was described. However, it will be appreciated that the CoMP controller may form part of one of the base stations (TPs) or another suitable network node (e.g. a core network node, such as the MME). It will also be appreciated that the functionalities of the CoMP controller may be shared among a plurality of nodes. For example, CoMP controller functionalities may be provided jointly by two or more base stations and/or they may be provided jointly by a core network node (e.g. the MME) and one or more base stations.

In the above exemplary embodiments, in the first stage, UE-TP associations are updated by the CoMP controller every few sub-frames. It will be appreciated that the periodicity of updates (i.e. the duration of the first stage) may be fixed, or it may vary depending on the information (CSI reports) provided by the base stations (TPs) to the CoMP controller and/or the like. For example, if a series of short-term CoMP CSI reports provided by the base stations (or at least one base station) indicate quick variations in channel state(s), then the CoMP controller may be configured to select a relatively short (e.g. less than 5 sub-frames) period for the first stage. On the other hand, if the series of short-term CoMP CSI reports provided by a base station do not indicate quick variations in channel state, then the CoMP controller may be configured to select a relatively long (e.g. more than 5 sub-frames) period for the first stage. It will be appreciated therefore that upon updating the UE-TP associations, the CoMP controller may be configured to indicate an associated validity period for the UE-TP associations (and/or indicate whether or not the validity period for the UE-TP associations is different than in the previous association round). The CoMP controller may also be configured to indicate the validity period for the UE-TP associations implicitly, e.g. by notifying the base stations about new UE-TP associations only when the UE-TP associations change. In this case the base stations (TPs) may be configured to maintain the previous UE-TP associations indefinitely until such UE-TP associations are updated by the CoMP controller.

In the above description of FIG. 7, the CoMP controller determines (in step S107) if any transmission point (e.g. small cells) need to be turned off for the duration of the current CoMP scheduling round, thereby reducing the risk of unnecessary interference. However, it will be appreciated that in addition to (or instead of) switching TPs on and off, the CoMP controller may also request them to apply muting (reduce the power) of their transmissions in the first stage (in at least some sub-frames thereof). In this case, for example, muting of a particular cell (or TP) may be enforced by the CoMP controller by assigning, to the base station operating that cell, a pattern of Almost Blank Sub-frames (ABS), for the duration of the first stage (or the sub-frames in which muting is to be applied). This may be realised, for example, in a similar manner to the so-called enhanced inter-cell interference coordination (eICIC) technique specified for LTE systems. The realization of selectively muting some of the subframes or subbands of a particular TP may also be accomplished by the CoMP controller sending, to the concerned TP, one or more appropriately formatted information element (IE), such as a CoMP information IE, an (enhanced) relative narrowband transmission power (e)RNTP IE, and/or the like.

It will also be appreciated that in step S107 the CoMP controller may determine muting and/or switching off a particular cell (TP) with respect to a number of frequency sub-bands only (e.g. for a portion of the total sub-band available in that cell). In this case the message at step S109 includes information identifying which frequency sub-bands are to be muted (e.g. using ABS) and/or switched off by the base station operating that particular cell.

It will be appreciated UE data rate may also be estimated from RSRQ measurements (e.g. instead of, or in addition to, RSRP and/or CQI/OLLA factor values reported by the mobile telephone). The key difference is that RSRQ is based on interference measurements made directly at the UE (rather than being estimated by the CoMP controller, e.g. from RSRP). Such RSRQ based data rate estimation may be realised using, for example, the so-called 'X2 Use Resource Status Reporting Initiation' and 'Resource Status Reporting' procedures specified for LTE, which may be adapted to include information identifying the mobile telephone (e.g. a UE ID and/or the like) and an associated RSRQ value. This modification may be especially beneficial for inter-frequency CoMP use cases, when the CoMP controller may not be able to accurately estimate the interference for a particular UE (from RSRP).

It will be appreciated that a particular UEs' CoMP measurement sets and/or anchor TP may be updated in response to the TP on/off pattern selected in the first stage. For example, a particular TP may be removed from a given UE's CoMP measurement set if that TP is in the 'off' state, and a particular TP may be added to a CoMP measurement set if that TP is in the 'on' state. Accordingly, the mobile telephone may be configured to carry out CSI reporting for only such TPs that are currently included in the mobile telephone's CoMP measurement set.

It will be appreciated that the serving base station may be configured to process the CSI reports received from the mobile device (by applying the appropriate OLLA factor at the base station rather than at the CoMP controller) before forwarding the CSI reports to the CoMP controller (at step S101). In other words, the serving base station may be configured to generate and forward pre-processed (updated) CSI reports to the CoMP controller (instead of forwarding 'raw' CSI reports received from the UE along with the associated OLLA factor).

The above described OLLA factor reporting (step S101) may be realised using current CoMP CSI reporting mechanisms specified by 3GPP since Rel-11. For the first stage, simple wideband CSI measurements are sufficient. However, in the second stage, full CSI reporting may also be used (in step S110). Accordingly, the mobile telephone may be configured to report two types of CSI information depending on whether the CSI information is for the first or second stage of the CoMP scheduling.

It will be appreciated that the value of the wideband CSI for all TPs in the measurement set, used for TP-association (step S105), may be reported (in step S101) periodically at a rate corresponding to the TP-association update rate. Detailed (sub-band specific) CSI reported by the mobile telephone may be used by the mobile telephone's currently assigned TP only, in the sub-frame (or slot) scheduling (step S111). In this case, in response to the UE-TP association made in step S105, the TP(s) for which each UE reports such detailed CSI may need to be updated to correspond to the set of currently active TPs.

In the second stage, the mobile telephone may be configured to send associated CSI information (in step S110) to the scheduling TP either directly (over-the-air) or via the anchor TP (over-the-air to the anchor TP, and via the backhaul between the anchor TP and the TP for which the CSI information is addressed). It will be appreciated that sending the CSI report directly to the scheduling TPs allows the TPs to receive the CSI reports without unnecessary delays, which may improve the overall scheduling performance.

In the above description, the mobile telephone provides CSI information to the CoMP controller via its serving base station. It will be appreciated, however, that the mobile telephone may also provide such CSI information directly to the CoMP controller (e.g. if the CoMP controller is co-located with one of the transmission points).

The above described CoMP scheduling is applicable to user equipment that supports CoMP operation. However it will be appreciated that the CoMP controller may be configured to perform the cell association step (UE-TP association) for both CoMP capable UEs and other UEs together. In this case, it will be appreciated that when making the UE-TP associations, the CoMP controller may estimate the data rate for UEs that do not support CoMP based on their respective RSRP measurements and/or RSRQ measurements.

The above description explained the operation of a two-stage CoMP scheduler using downlink transmissions as an example. However, it will also be appreciated that the above two-stage scheduler may also be used for scheduling uplink transmissions. In this case, instead of using the CSI report(s) from the mobile telephone to obtain a data rate estimate, a measure of uplink signal quality may be used. For example, such a measure of uplink signal quality may comprise a signal-to-interference-plus-noise ratio (SINR) calculated from a sounding reference signal (SRS) transmitted by the mobile telephone. Furthermore, it will also be appreciated that, at least for uplink scheduling purposes, the UE-TP association(s) may be chosen to optimise a metric other than data rate. For example, the UE-TP association(s) may be chosen for optimising a total power transmitted by all (served) UEs and/or for optimising a target received SINR for each (served) UE.

In the above exemplary embodiments, a mobile telephone based telecommunications system was described. As those skilled in the art will appreciate, the signalling techniques described in the present application can be employed in other communications system. Other communications nodes or devices may include user devices such as, for example, personal digital assistants, laptop computers, web browsers, etc.

In the exemplary embodiments described above, the mobile telephone and the base stations will each include transceiver circuit. Typically this circuit will be formed by dedicated hardware circuits. However, in some exemplary embodiments, part of the transceiver circuit may be implemented as software run by the corresponding controller.

In the above exemplary embodiments, a number of software modules were described. As those skilled in the art will appreciate, the software modules may be provided in compiled or un-compiled form and may be supplied to the base station or the relay station as a signal over a computer network, or on a recording medium. Further, the functionality performed by part or all of this software may be performed using one or more dedicated hardware circuits.

The apparatus may estimate the data rate using a correction term (e.g. a correction term obtained from an OLLA process) derived from the at least one CSI report.

The estimating means may be operable to estimate a data rate for a particular mobile device via a particular transmission point based on a corresponding wideband (and/or a sub-band) channel quality indicator (CQI) included in the at least one CSI report.

The apparatus may be configured to perform the estimating, determining and sending at least once every radio frame, for example wherein the apparatus is configured to perform the estimating, determining and sending at least once every few subframes wherein the few subframes are less than ten subframes.

The determining means may be operable to determine, based on the data rate estimated by the estimating means, whether a particular transmission point that is not included in the active transmission point set is to be turned off or muted (optionally for some but not all subframes). In the case when the determining means determines that a particular transmission point is to be turned off or muted, the sending means may be operable to send, to that transmission point, information identifying that the particular transmission point is to be turned off or muted (optionally for some but not all subframes). For example, the information identifying that the particular transmission point is to be turned off or muted may identify that the particular transmission point it is to be turned off or muted for some but not all subframes by identifying an almost blank subframe (ABS) pattern and/or by using one or more appropriately formatted information element (IE)—e.g. a coordinated multi-point information IE and/or a relative narrowband transmission power IE.

The determining means may be operable to determine a subband of a particular transmission point that is to be turned off or muted, in which case the sending means may be operable to send, to the particular transmission point, information identifying that particular subband.

The apparatus may comprise a base station operating in accordance with the long term evolution (LTE) set of standards.

The transmission point may further comprise means for obtaining a correction term (e.g. a correction term obtained from an OLLA process) and the sending means may be operable to send, to the controller, information identifying the correction term for use in estimating a data rate for transmission via the transmission point. The transmission point may further comprise means for processing the received at least one CSI report based on the correction term, in which case the information identifying the correction term may comprise at least one CSI report processed based on the correction term.

The transmission point may comprise scheduling means for scheduling transmissions for the at least one mobile device in response to the second receiving means receiving the information identifying an association between the transmission point and the at least one mobile device. The scheduling means may be operable to schedule the transmissions for the at least one mobile device for a predetermined number of subframes or slots.

The transmission point may comprise third receiving means for receiving information identifying that a particular transmission point is to be turned off or muted (optionally for some but not all subframes). The transmission point may comprise means for configuring a set of transmission points for which the at least one CSI report relates to and the set of transmission points may be configured such that a particular transmission point is removed from the set (optionally for some but not all subframes) when the receiving means receives information identifying that that particular transmission point is to be turned off or muted. The transmission point may also comprise means for maintaining an anchor transmission point such that a different transmission point is selected when the third receiving means receives information identifying that a currently selected anchor particular transmission point is to be turned off or muted.

The transmission point may comprise at least one of: i) a base station; ii) a remote radio head, RRH; and a relay node, RN. For example, the transmission point may comprise a base station operating in accordance with the long term evolution (LTE) set of standards.

Various other modifications will be apparent to those skilled in the art and will not be described in further detail here.

This application is based upon and claims the benefit of priority from United Kingdom Patent Application No. 1510325.2, filed on Jun. 12, 2015, the disclosure of which is incorporated herein in its entirety by reference.

The invention claimed is:

1. A method performed by an apparatus in a communication system providing coordinated transmissions to at least one mobile device via a plurality of transmission points, wherein each transmission point is operating at least one cell, the method comprising:
receiving at least one Channel State Information, CSI, report from at least one transmission point of the plurality of transmission points;
estimating, based on information derived from the at least one CSI report, a data rate for transmission via the at least one transmission point;
determining, based on the data rate estimated by the estimating, an active transmission point set comprising at least one transmission point to be associated with the at least one mobile device; and
sending, to each transmission point included in the active transmission point set, information identifying an association with the at least one mobile device.

2. A non-transitory computer implementable instructions product comprising computer implementable instructions for causing a programmable communications device to perform the method of claim 1.

3. Apparatus for controlling coordinated transmissions, in a communication system comprising at least one mobile device and a plurality of transmission points, each transmission point operating at least one cell, the apparatus comprising:
a receiver configured to receive at least one Channel State Information, CSI, report from at least one transmission point of the plurality of transmission points;
a controller configured to estimate, based on information derived from the at least one CSI report, a data rate for transmission via the at least one transmission point and determine, based on the data rate estimated, an active transmission point set comprising at least one transmission point to be associated with the at least one mobile device; and
a transmitter configured to send, to each transmission point included in the active transmission point set, information identifying an association with the at least one mobile device.

4. Apparatus according to claim 3, wherein the data rate is estimated using a correction term derived from the at least one CSI report.

5. Apparatus according to claim 3, wherein the controller is operable to estimate a data rate for a particular mobile device via a particular transmission point based on a corresponding wideband channel quality indicator, CQI, included in the at least one CSI report.

6. Apparatus according to claim 3, wherein the apparatus is configured to perform the estimating, determining and sending at least once every radio frame, for example wherein the apparatus is configured to perform the estimating, determining and sending at least once every few subframes wherein the few subframes are less than ten subframes.

7. Apparatus according to claim 3, wherein the controller is operable to determine, based on the data rate estimated by the controller, whether a particular transmission point that is not included in the active transmission point set is to be turned off or muted.

8. Apparatus according to claim 7, wherein when the controller determines that a particular transmission point is to be turned off or muted, the transmitter is operable to send, to that transmission point, information identifying that the particular transmission point is to be turned off or muted.

9. Apparatus according to claim 8, wherein the information identifying that the particular transmission point is to be turned off or muted identifies that the particular transmission point it is to be turned off or muted for some but not all subframes by identifying an almost blank subframe, ABS, pattern and/or by using one or more appropriately formatted information element, IE (e.g. a coordinated multi-point information IE and/or a relative narrowband transmission power IE).

10. Apparatus according to claim 7, wherein the controller is operable to determine a subband of a particular transmission point that is to be turned off or muted, and wherein the sending means is operable to send, to the particular transmission point, information identifying that particular subband.

11. Apparatus according to claim 3, comprising a base station operating in accordance with the long term evolution, LTE, set of standards.

* * * * *